US009618042B2

(12) United States Patent
Kamath et al.

(10) Patent No.: US 9,618,042 B2
(45) Date of Patent: Apr. 11, 2017

(54) INNER RING WITH UNDERCUT TO IMPROVE TANG FLEXIBILITY

(71) Applicant: Emerson Power Transmission Corp., Florence, KY (US)

(72) Inventors: Anil Kamath, Pune (IN); Apaar Sharma, Durham, NC (US)

(73) Assignee: Regal Beloit America, Inc., Beloit, WI (US)

( * ) Notice: Subject to any disclaimer, the term of this patent is extended or adjusted under 35 U.S.C. 154(b) by 281 days.

(21) Appl. No.: 14/081,141

(22) Filed: Nov. 15, 2013

(65) Prior Publication Data

US 2015/0104125 A1  Apr. 16, 2015

(30) Foreign Application Priority Data

Oct. 10, 2013  (IN) .......................... 3206/MUM/2013

(51) Int. Cl.
*F16C 33/58* (2006.01)
*F16C 35/063* (2006.01)

(52) U.S. Cl.
CPC .......... *F16C 33/586* (2013.01); *F16C 35/063* (2013.01)

(58) Field of Classification Search
CPC .... F16C 35/063; F16C 35/0635; F16C 35/06; F16C 35/12; F16C 35/067; F16C 35/07; F16C 33/586; F16C 33/583; F16C 33/581; F16L 23/036; F16B 7/042; F16B 7/0413; F16B 7/0406; F16D 1/0817
See application file for complete search history.

(56) References Cited

U.S. PATENT DOCUMENTS 2,136,819 A * 11/1938 Large .................... F16C 35/063
                                                    384/541
2,584,740 A *  2/1952 Reynolds .............. F16C 35/063
                                                    384/541
(Continued)

FOREIGN PATENT DOCUMENTS

FR          3004769 A1    10/2014

OTHER PUBLICATIONS

Combined Search and Examination Report dated Feb. 28, 2015 in corresponding patent application in Great Britian Serial No. GB1416151.7 (two pages).

*Primary Examiner* — Daniel Yabut
(74) *Attorney, Agent, or Firm* — Harness, Dickey & Pierce, PLC

(57) ABSTRACT

A bearing assembly for rotatably supporting a shaft member having an outer ring, having a first bearing raceway, and an inner ring, having a second bearing raceway. The raceways are opposingly spaced relative to each other. The inner ring includes a plurality of tang members extending in a cantilevered configuration from at least one end of the inner ring having slots formed therebetween. Bearing members are positioned in a space between and in engagement with the first and second bearing raceways. An undercut groove extends circumferentially along an inner surface of the inner ring generally adjacent the plurality of tang members. The undercut groove is operable to increase an effective cantilever distance of the plurality of tang members. The assembly further includes a locking member engaging the plurality of tang members and exerting a compressing force upon the plurality of tang members to couple the inner ring to the shaft.

8 Claims, 3 Drawing Sheets

(56) References Cited

U.S. PATENT DOCUMENTS

| | | | | |
|---|---|---|---|---|
| 3,276,828 | A | * | 10/1966 | Mansfield ............ F16C 35/063 384/585 |
| 3,397,021 | A | * | 8/1968 | Fitzsimmons .......... F16C 33/58 384/585 |
| 4,537,519 | A | * | 8/1985 | LaRou .................. F16C 35/063 384/478 |
| 5,863,137 | A | * | 1/1999 | Johnson ................ F16C 35/063 384/537 |
| 6,543,939 | B1 | | 4/2003 | Parejko |
| 6,908,230 | B2 | * | 6/2005 | Johnson ................ F16C 35/063 384/537 |
| 7,306,375 | B2 | * | 12/2007 | Lenick ................... F16C 19/06 384/537 |
| 2003/0169954 | A1 | * | 9/2003 | Lenick .................. F16C 35/063 384/537 |
| 2007/0098314 | A1 | | 5/2007 | Lenick et al. |

* cited by examiner

INNER RING WITH UNDERCUT TO IMPROVE TANG FLEXIBILITY

CROSS-REFERENCE TO RELATED APPLICATIONS

This application claims the benefit and priority of India Patent Application No. 3206/MUM/2013, filed Oct. 10, 2013. The entire disclosure of the above application is incorporated herein by reference.

FIELD

The present disclosure relates to bearing assemblies and, more particularly, relates to bearing assemblies having an inner ring with an undercut to provide improved tang flexibility.

BACKGROUND AND SUMMARY

This section provides background information related to the present disclosure which is not necessarily prior art. This section provides a general summary of the disclosure, and is not a comprehensive disclosure of its full scope or all of its features.

Various arrangements are known in the art for securing the inner bearing ring of a bearing assembly onto a rotating shaft. Such arrangements have included shaft engaging set screws and shaft-surrounding locking collars. Such locking collars include locking or tightening means, generally in the form of one or more locking screws. In the arrangement disclosed in U.S. Pat. Nos. 4,537,519 and 6,908,230, which are hereby incorporated herein and made a part of the present teachings, a bearing assembly is provided wherein the inner ring includes equally spaced inner ring finger extensions or tangs which, when locked with a single screw locking collar, serves to grip and hold a shaft and the inner ring tightly in position allowing improved concentricity of the inner ring with the shaft and higher shaft speeds.

The present teachings can be utilized in combination with any one of a number of known force applying arrangements for securing a bearing assembly to a shaft and are particularly adaptable to the compressible collar and inner ring finger extensions of the known SKWEZLOC® arrangement resulting in the aforementioned advantages of improved shaft-ring concentricity and increased capacity for locking under high loads and high speed shaft operations.

Generally, these bearing assemblies are provided for use with a shaft that passes through the bearing assembly. Specifically, the bearing assembly may include an annular inner ring having a grooved raceway which is wear hardened to extend the bearing life. Surrounding the annular inner ring in spaced relation therefrom, is an annular outer ring having a grooved raceway disposed therein in opposed relationship to the inner ring raceway. The raceways serve to receive in nesting relationship therewith a plurality of spaced ball or rolling elements mounted in rolling element pockets of a rolling element cage. A lubricating passage is provided in the outer bearing ring which is aligned with a passage in bearing assembly housing or pillow block in which bearing assembly is mounted. To seal the rolling element cage assembly, annular inner flingers and outer flingers with annular seals therebetween are press-fitted respectively on the outer and inner bearing rings on either side of the loaded rolling element cage. In this way, the rolling elements can provide reduced frictional rotation of the shaft relative to the bearing assembly while rotating in the hardened raceways of the inner and outer rings.

The inner ring may include the aforementioned inner ring finger extensions or tangs that project from the inner ring and surround the shaft. These finger extensions or tangs are then collapsed to some extent around the shaft to define the concentricity of the now-combined assembly.

However, through recent analysis, it has been found that in some applications where shafts of commercial grade are used, which may lack the turned ground and polished finish of a higher grade shaft, may result in an out of concentricity of the combined inner ring and shaft assembly. That is, use of lower grade shafts having reduced tolerance demand may require that the inner ring finger extensions or tangs accommodate a greater degree of deflection and/or require that the inner ring finger extensions or tangs accommodate a varying degree of deflection from one extension to another extension. However, it has been found that as a result, at least in part, of this greater degree of deflection and the varying degree of deflection from one extension to another extension, the bearing raceway can become distorted upon installation of the locking collar. This can further lead to inconsistent raceway dimensioning between the inner ring and the outer ring causing reduced bearing performance and lifespan.

The present teachings provide an improved inner ring configuration of a bearing assembly capable of accommodating a greater degree of shaft variations and further inhibit raceway deformation. Moreover, the present teachings provide an improved inner ring configuration that is be easily manufactured to provide the benefits of improved concentricity to a greater range of shaft dimensions and conditions. Moreover, the present teachings provide an inner ring configuration that is capable of reducing ball path deformation of the bearing raceway for improved operation and wear.

Accordingly, a bearing assembly for rotatably supporting a shaft member having advantageous construction is provided according to the principles of the present teachings. The bearing assembly includes an outer ring, having a first bearing raceway, and an inner ring, having a second bearing raceway. The raceways are oppositely spaced relative to each other. The inner ring includes a plurality of tang members extending in a cantilevered configuration from at least one end of the inner ring having slots formed therebetween. Bearing members are positioned in a space between and in engagement with the first and second bearing raceways. An undercut groove extends circumferentially along an inner surface of the inner ring generally adjacent the plurality of tang members. The undercut groove is operable to increase an effective cantilever distance of the plurality of tang members. The assembly further includes a locking member engaging the plurality of tang members and exerting a compressing force upon the plurality of tang members to couple the inner ring to the shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
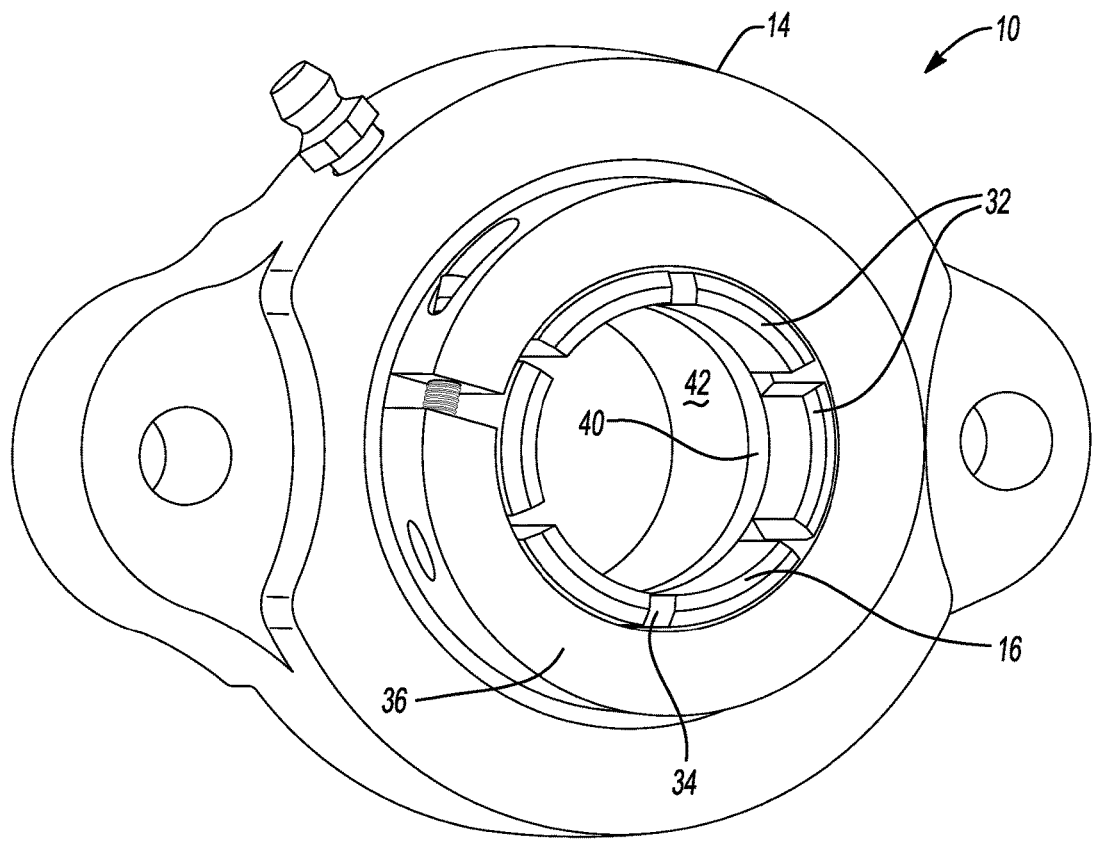
FIG. 1 is a perspective view illustrating a bearing assembly according to the principles of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
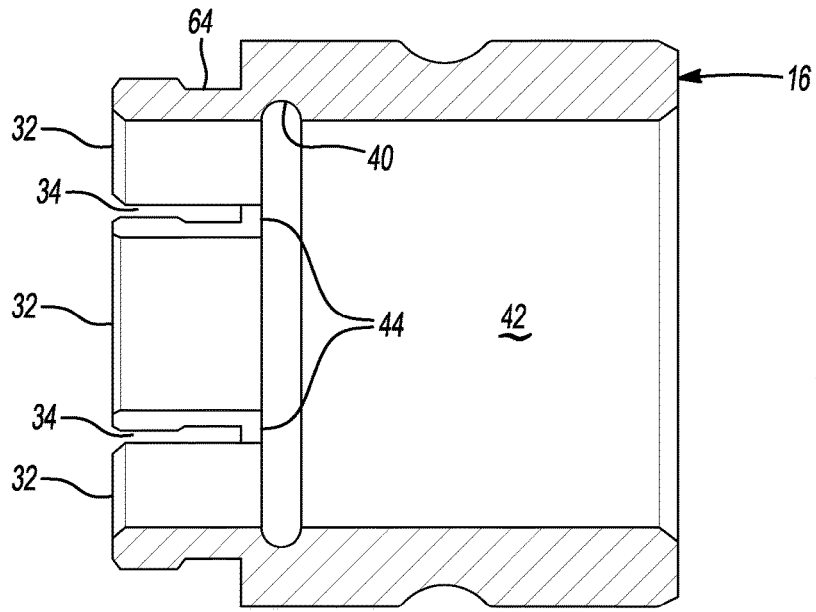
FIG. 2 is a cross-sectional view illustrating an inner ring having an undercut groove according to the principles of the present teachings.
Figure 3:
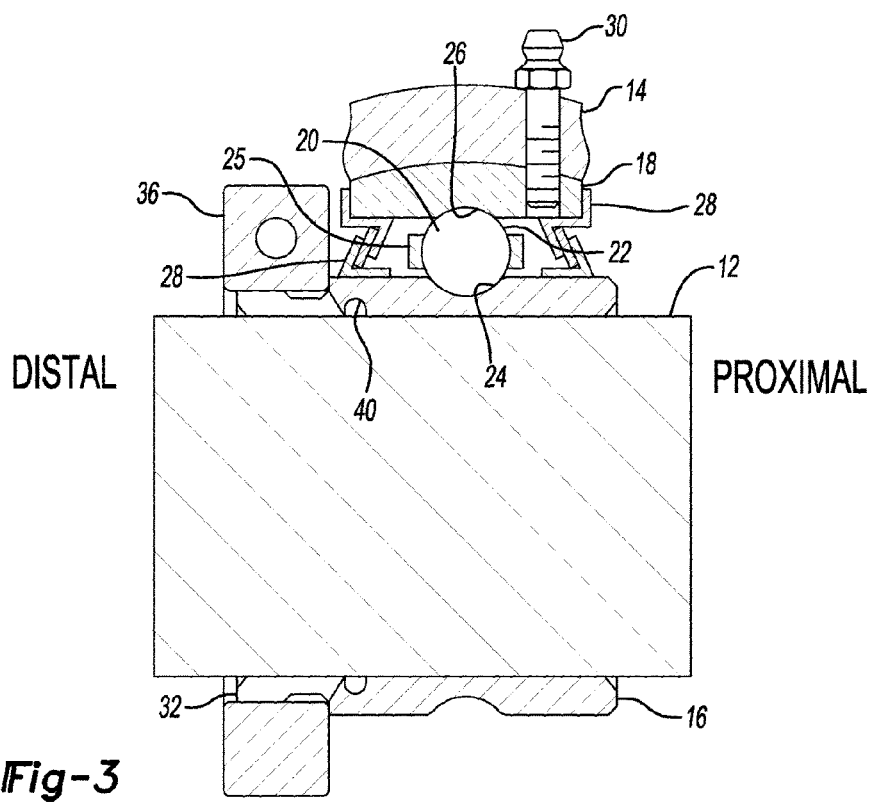
FIG. 3 is a cross-sectional view, with portions removed for clarity, illustrating the bearing assembly according to the principles of the present teachings.

According to the principles of the present teachings, a bearing assembly 10 having an advantageous construction is illustrated in the associated figures and described herein. With particular reference to FIGS. 1-3, the bearing assembly 10 is configured for use with a shaft member 12 (FIG. 3). More particularly, bearing assembly 10 can comprise a bearing housing 14 having an annular inner ring 16 rotatably disposed within an outer ring 18 within bearing housing 14. Inner ring 16 can be, at least indirectly, supported for rotation with shaft member 12 by a plurality of bearing members or other anti-friction members 20 positioned about an exterior side of inner ring 16 and an interior side of outer ring 18. In this way, the plurality of bearing members 20 can be positioned within a circumferential raceway 22 extending between inner ring 16 and outer ring 18. Specifically, raceway 22 can comprise a grooved raceway 24 formed circumferentially along an outer surface of inner ring 16 and an opposing grooved raceway 26 formed circumferentially along an inner surface of outer ring 18. Grooved raceway 24 of inner ring 16 and grooved raceway 26 of outer ring 18 are in spaced relationship to each other to define raceway 22. In some embodiments, grooved raceway 24 and/or grooved raceway 26 are wear hardened for improved bearing life and operation. In some embodiments, the plurality of bearing members 20 can be captured within a bearing cage 25.

In some embodiments, one or more seal members 28 can be used to engage opposing ends of inner ring 16, outer ring 18, bearing members 20, and/or bearing housing 14 to retain a lubricant (e.g. grease) within a volume containing bearing members 20. Lubricant can be inserted with this volume via a grease fitting 30 (FIG. 3).

With particular reference to FIGS. 1-4, inner ring 16 includes a plurality of tang members 32 extending therefrom in annular cantilever fashion to surround shaft member 12. Tang members 32 are provided with a plurality of slots 34 parallel the axis of shaft rotation to permit radial compression by a surrounding slotted locking collar 36. It should be understood, however, that alternative locking force arrangements besides collar 36 can be used.

With continued reference to FIGS. 1-4, in some embodiments, inner ring 16 further comprises an undercut groove 40 extending along an inner surface 42 of inner ring 16. Undercut groove 40 can extend circumferentially about inner surface 42 of inner ring 16 to define a complete and continuous groove. Undercut groove 40 can be positioned generally adjacent and/or intersecting proximal end 44 of slots 34. Undercut groove 40 can serve, at least in part, to extend the effective cantilever beam length of tang member 32, thereby providing improved beam deflection range without increasing the width of inner ring 16 nor impinging on a hardened area of grooved raceway 24 of inner ring 16, as will be discussed in greater detail herein.

Figure 4:
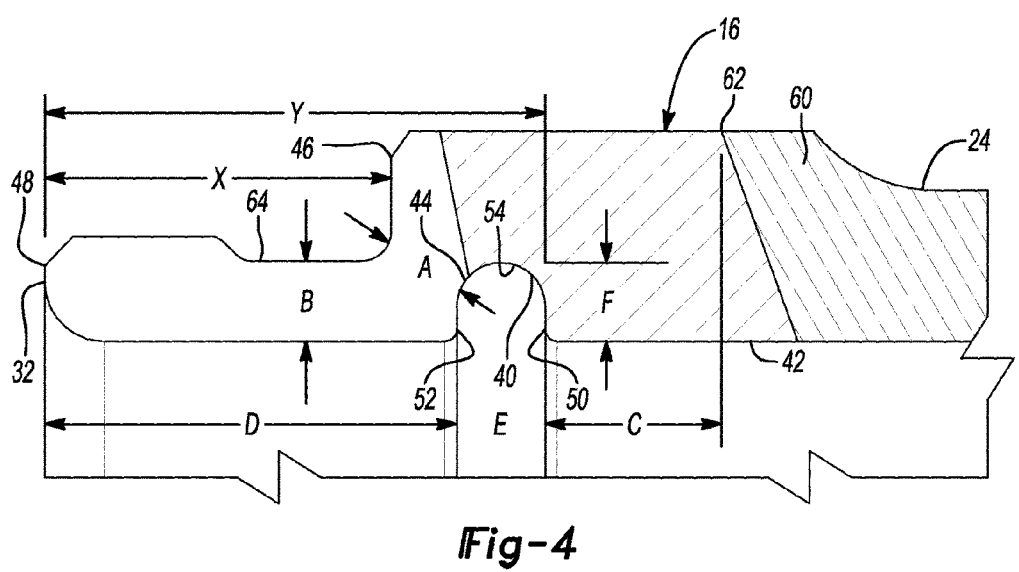
FIG. 4 is an enlarged cross-sectional view illustrating the inner ring having an undercut groove according to the principles of the present teachings.

By way of background, with particular reference to FIG. 4, it should be understood that existing inner ring designs having finger extensions or tangs have an actual tang length X, which extends from an abutment face or shoulder 46 of the inner ring to a distal end 48 of the tang. As can be appreciated, this reduced actual tang length X results in minimal tang deflection capability which directly limits the ability of the plurality of tangs to accommodate varying shaft member dimensions as discussed herein. However, in accordance with the present teachings, the addition of undercut groove 40 increases the effective tang length to Y, which extends from distal end 48 of tang 32 to an inboard or proximal side 50 of undercut groove 40. This increased effective tang length Y provides improved ability of tangs 32 to accommodate varying shaft member dimensions and out-of-round conditions.

Figure 6A:
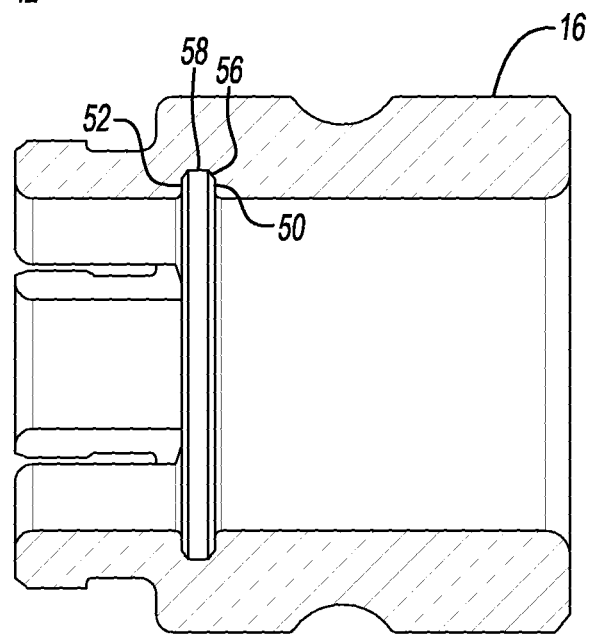
FIG. 6A is a cross-sectional view illustrating an inner ring having an undercut groove according to some embodiments of the present teachings.
Figure 6B:
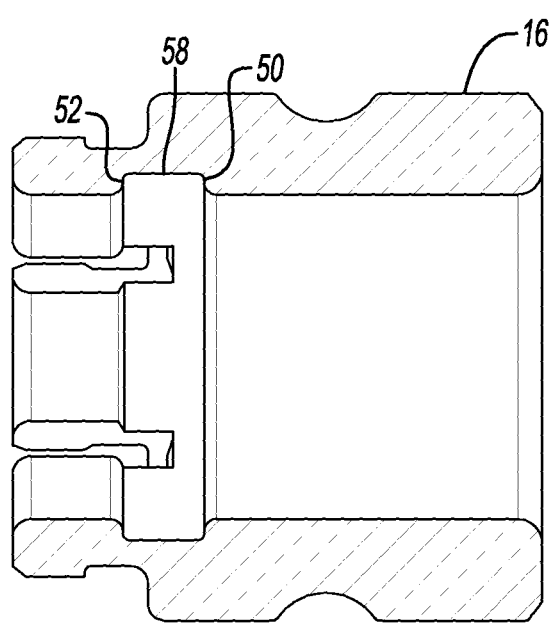
FIG. 6B is a cross-sectional view illustrating an inner ring having an undercut groove according to some embodiments of the present teachings.

As can be appreciated with reference to FIGS. 4, 6A, and 6B, undercut groove 40 can comprise any one of a number of cross-sectional configurations when viewed along a plane parallel to the axis of rotation of shaft member 12. Specifically, in some embodiments, undercut groove 40 can comprise a generally arcuate groove shape having generally parallel edges—namely proximal side 50 and distal side 52. Sides 50, 52 can extend from inner surface 42 to a terminal arcuate surface 54 within undercut groove 40. Alternatively, in some embodiments as illustrated in FIG. 6A, sides 50, 52 can extend from inner surface 42 to inner chamfers 56 and an inner planar surface 58. Inner planar surface 58 can be generally flat. Similarly, in some embodiments as illustrated in FIG. 6B, sides 50, 52 can extend from inner surface 42 to inner planar surface 58 (without inner chamfers 56). Moreover, it should be recognized that the specific size and dimensions can vary depending on operation and intended conditions. For instance, as illustrated in FIG. 6B, the width and depth of undercut groove 40 can vary.

It should be understood that undercut groove 40 can have any cross-sectional geometry, such as rectangular, semicircular or trapezoidal, provided the feature removes material from the inner ring and isolates the tang region.

However, in some embodiments, various dimensional relationships result in a beneficial compromise and improved operation. Specifically with reference to FIG. 4, in some embodiments, it has been found that the following dimensional relationship results in relieving stresses in the region of tang 32. That is, the dimension A, which is the minimum thickness extending between undercut groove 40 and abutment surface 46, can be generally equal to dimension B, which is the minimum thickness of tang 32 taken along a direction orthogonal to the axis of rotation of shaft member 12 generally a reduced-thickness section of tang 32. By ensuring dimensions A and B are generally equal to each other, the depth F of undercut groove 40 is established which results in relieve stresses in tang 32.

Figure 5:
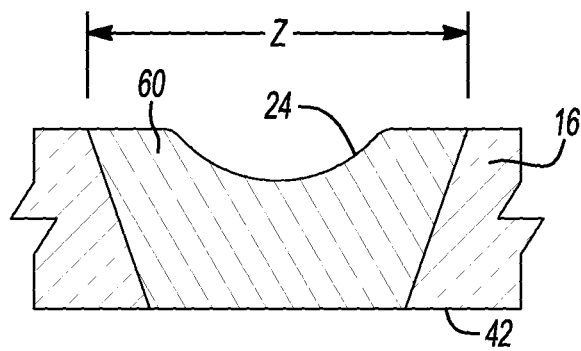
FIG. 5 is an enlarged cross-sectional view illustrating the wear hardened region of the inner ring.

Furthermore, in some embodiments, it has been found that the following dimensional relationship results in improved operation of undercut groove 40 without negatively impacting the reliability of wear hardened bearing raceway 24 of inner ring 16. As discussed herein, it is desirable to wear harden bearing raceway 24 of inner ring 16 to improve bearing life and operation. Wear hardening of bearing raceway 24 results in a region 60 of hardened material generally denoted by cross-sectioning in FIGS. 4 and 5. Hardened region 60 can define an edge-to-edge width along outer surface of inner ring 16 of dimension Z (FIG. 5). Hardened region 60 can further define an edge-to-edge width along inner surface 42 of inner ring 16 that is less than dimension Z, generally resulting in an inwardly tapered cross-section. With reference to FIG. 4, a width E of undercut groove 40 can be determined in connection with dimension Z of hardened region 60 and an offset distance C between distal point 62 of hardened region 60 and proximal side 50 of undercut groove 40 (it should be noted that distance C is measured along a single axis parallel to the axis of rotation of shaft member 12 (e.g. axial direction)). Specifically, dimension C can be greater than or equal to a constant K times dimension E. Dimension C thus represents a minimum spacing distance before proximal side 50 of undercut groove 40 and hardened region 60, which in turn limits the width E of undercut groove 40. This arrangement inhibits, or at least reduces, the negative effect on raceway 24 of inner ring 16 following application of locking collar 36 about tangs 32. Therefore, raceway 24 can maintain a proper cross-sectional shape and spacing from opposing raceway 26, thereby providing improved bearing life and operation. In some embodiments, constant K can be approximately 0.6 for smaller applications.

It should be understood that the cross-sectional shape of undercut groove 40 can affect the heat treatment process of inner ring 16 following initial machining. In some cases, improper dimensioning of inner ring 16 can result in internal cracks within inner ring. Therefore, it has been found that in applications employing heat treatment, dimension C should also be at least half of dimension Z to provide sufficient standoff distance to ensure proper heat treatment.

Referring again to FIG. 3, in some embodiments, the width of collar 36 is substantially equal to the length X of tang members 32, which facilitates collar mounting during assembly to assure aligned seating or squaring of collar 36. However, it should be understood that collar 36 may define a greater or lesser width dimension.

In some embodiments, tang members 32 can comprises an circumferential groove or recess 64 extending circumferentially around the outer surface of tang members 32 in spaced relation from distal end 48. In some embodiments, the width of recess 64 is approximately one half the width of locking collar 36.

According to the principles of the present teachings, the bearing assembly and, more particularly, the inner ring permits increased deflection of the tang members and thus is capable of accommodating a greater tolerance range of shaft members without negatively impacting the roundness value of the bearing raceway, thereby providing a greater range of acceptable shaft member dimensions while maintaining reliable and efficient bearing operation. This configuration results in improved bearing life and performance.

Furthermore, the principles of the present teachings provide a number of advantages over the prior art, such as, but not limited to, increased tang deformation, improved shaft holding capacity, and reduced out of roundness at raceway due to locking. This results in reduced vibration and noise generated by the bearing assembly. This further permits accommodating commercial grade shaft members that have not been turned ground and/or polished, which reduces manufacturing and assembly costs.

The principles of the present teachings can be used in all collar locking applications where raceway roundness is a key parameter and in applications requiring increased effective tang length without the need to physically increase the overall length of the inner ring.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bearing assembly for rotatably supporting a shaft member, said bearing assembly comprising:
   an outer ring having a first bearing raceway;
   an inner ring having a second bearing raceway, said second bearing raceway being opposingly annularly spaced relative to said first bearing raceway, said inner ring having a plurality of tang members extending in a cantilevered configuration from at least one end of said inner ring, each of said plurality of tang members having a slot formed therebetween;
   a plurality of bearing members being positioned in a space between and in engagement with said first bearing raceway and said second bearing raceway;
   an outer groove extending circumferentially along an outer surface of said plurality of tang members;
   an undercut groove extending circumferentially along an inner surface of said inner ring and intersecting a proximal end of each of said slots formed between said plurality of tang members, said undercut groove being axially offset relative to said outer groove; said undercut groove adapted to increase an effective cantilever distance of said plurality of tang members compared to an actual cantilever distance of each of said plurality of tang members, said effective cantilever distance being measured from a distal end of each of said plurality of tang members to a proximal side of said undercut groove; and
   a locking member engaging said plurality of tang members and exerting a compressing force upon said plurality of tang members to couple said inner ring to the shaft,
   wherein said second bearing raceway is wear hardened to define a wear hardened region of hardened material, said wear hardened region having a width when measured along an outer surface of said inner ring, a standoff distance between a distal point of said wear hardened region and said proximal side of said undercut groove being sized at least one half of said width.

2. The bearing assembly according to claim 1 wherein said undercut groove extending circumferentially along said inner surface of said inner ring extends continuously along said inner surface of said inner ring.

3. The bearing assembly according to claim 1 wherein each of said plurality of tang members comprises said outer groove and an inner surface thereby defining a minimum thickness therebetween, said minimum thickness of each of said plurality of tang members being generally equal to a minimum wall thickness between said outer groove of said tang members and said undercut groove.

4. The bearing assembly according to claim 1 wherein said wear hardened region of hardened material comprises a distal point along an outer surface of said inner ring, an axial distance between said distal point and said proximal side of said undercut groove being greater than or equal to a width of said undercut groove multiplied by a predetermined constant.

5. The bearing assembly according to claim 4 wherein said predetermined constant is 0.6.

6. The bearing assembly according to claim 1 wherein said undercut groove comprises opposing parallel sides terminating at an arcuate surface.

7. The bearing assembly according to claim 1 wherein said undercut groove comprises opposing parallel sides terminating at a planar surface.

8. The bearing assembly according to claim 1, further comprising a chamfer formed between at least one of said parallel sides and said planar surface.

* * * * *